United States Patent
Tsukano et al.

(10) Patent No.: US 8,136,376 B2
(45) Date of Patent: Mar. 20, 2012

(54) ELECTRIC LOCK DEVICE

(75) Inventors: Tetsuyuki Tsukano, Kanagawa-ken (JP); Takahiro Okada, Kanagawa-ken (JP)

(73) Assignee: Alpha Corporation, Yokohama-shi (JP)

(*) Notice: Subject to any disclaimer, the term of this patent is extended or adjusted under 35 U.S.C. 154(b) by 0 days.

(21) Appl. No.: 11/659,999

(22) PCT Filed: Sep. 20, 2005

(86) PCT No.: PCT/JP2005/017253
§ 371 (c)(1),
(2), (4) Date: Mar. 12, 2007

(87) PCT Pub. No.: WO2006/040906
PCT Pub. Date: Apr. 20, 2006

(65) Prior Publication Data
US 2007/0295044 A1    Dec. 27, 2007

(30) Foreign Application Priority Data
Oct. 12, 2004  (JP) .............. P2004-297907

(51) Int. Cl.
*B60R 25/02* (2006.01)
(52) U.S. Cl. ........................... 70/252; 70/186
(58) Field of Classification Search ............ 70/181–187, 70/252
See application file for complete search history.

(56) References Cited

U.S. PATENT DOCUMENTS

| | | | | |
|---|---|---|---|---|
| 1,806,253 A | * | 5/1931 | Fairchild | 70/252 |
| 5,230,233 A | * | 7/1993 | Shoji et al. | 70/252 |
| 5,271,252 A | * | 12/1993 | Yasuhara et al. | 70/186 |
| 5,315,851 A | * | 5/1994 | Kuroki | 70/252 |
| 5,495,732 A | * | 3/1996 | Nagae et al. | 70/252 |
| 6,076,382 A | * | 6/2000 | Naganuma | 70/186 |
| 6,233,986 B1 | * | 5/2001 | Suzuki et al. | 70/186 |
| 6,571,587 B2 | * | 6/2003 | Dimig et al. | 70/186 |
| 2002/0088257 A1 | | 7/2002 | Dimig et al. | |
| 2004/0250577 A1 | * | 12/2004 | Watanuki et al. | 70/186 |
| 2005/0183476 A1 | * | 8/2005 | Feucht et al. | 70/186 |

(Continued)

FOREIGN PATENT DOCUMENTS
DE    100 61 960 A1    7/2002
(Continued)

OTHER PUBLICATIONS

Communication Report, Application No. 05 785 340.0, issued on Dec. 5, 2011, in the counterpart European application, five (5) pages.

*Primary Examiner* — Suzanne Dino Barrett
*Assistant Examiner* — Christopher Boswell
(74) *Attorney, Agent, or Firm* — The Nath Law Group; Jerald L. Meyer; Robert T. Burns (57) ABSTRACT

An electric lock device including a movable member, a cam plate (5) rotated in an unlocking direction and a locking direction by the driving of a drive source, and a lock member (8) including a cam contact surface (10) in contact with a sliding surface (6) of the cam plate (5). The lock member (8) follows the sliding surface (6) to be displaced between a locking position for inhibiting the movement of the movable member and an unlocking position for allowing the movement of the movable member. The cam profile of the sliding surface (6) is set so that the rotary torque of the cam plate (5) necessary for moving the lock member (8) from the locking position to the unlocking position can be maintained at approximately a constant value.

3 Claims, 12 Drawing Sheets

U.S. PATENT DOCUMENTS

2009/0139284 A1 * 6/2009 Sugimoto ....................... 70/186

FOREIGN PATENT DOCUMENTS

| EP | 0 764 565 A1 | 3/1997 |
| JP | 2530045 | 12/1996 |
| JP | 2000-154674 | 6/2000 |
| JP | 2002-234419 | 8/2002 |
| JP | 2003-276564 | 10/2003 |
| JP | 2003-341479 | 12/2003 |
| WO | 2005/081822 A2 | 9/2005 |

* cited by examiner

ELECTRIC LOCK DEVICE

TECHNICAL FIELD

The present invention relates to an electric lock device for locking a movable member.

BACKGROUND ART

Conventional lock devices of this type are applied to steering lock devices for inhibiting and allowing the rotation of a steering wheel, shift lock devices for inhibiting and allowing the movement of a select lever of an automatic transmission, and the like. For example, a conventional steering lock device includes a cam member which rotates in an unlocking direction and a locking direction while interlocking an operation of a key knob, and a cam contact surface in contact with a sliding surface of the cam member. The conventional steering lock device further includes a lock member which follows the movement of the sliding surface of the cam member so as to move between an unlocking position for allowing the rotation and movement of the steering shaft as a movable member and a locking position for inhibiting the rotation of a steering shaft (e.g., see the following patent document: Japanese Utility Model Registration Publication No. 2530045).

In such a manually-operated device, even if the rotary torque necessary for rotating the cam member is large in a partial range or has variations, an operator can easily rotate the cam member only by applying a force. Accordingly, the cam profile of the sliding surface of the cam member is designed with importance placed on rotation angles from the start of the operation to the end of the operation but no importance placed on an unlocking force.

However, in the case of an electric steering lock device, the cam profile of a sliding surface of a cam member needs to be determined, so that a load on a motor serving as a drive source does not become large. Here, it is conceivable to design the cam profile of the sliding surface of the cam member, so that the shift stroke amount of a lock member per rotation angle of the cam member can be maintained constant.

DISCLOSURE OF THE INVENTION

However, if the cam profile of a sliding surface of a cam member is set as described above, the rotary torque of a motor necessary for moving a lock member from a locking position to an unlocking position varies depending on the rotation position of the cam member. That is, the larger the radial length from the rotation center of the cam plate to a sliding point, the larger a rotary torque required. Accordingly, since a motor is selected based on the maximum rotary torque required, a motor having a large rotary torque has needed to be mounted.

The present invention has been accomplished in order to solve the above-described problems of conventional techniques. An object of the present invention is to provide an electric lock device in which a lock member can be moved using a drive source having a small rotary torque.

In order to achieve the above-described object, an aspect of the present invention is an electric lock device including: a movable member; a cam member rotated in an unlocking direction and a locking direction by driving of a drive source; and a lock member including a cam contact surface in contact with a sliding surface of the cam member. The lock member follows the sliding surface to move between a locking position for inhibiting movement of the movable member and an unlocking position for allowing the movement of the movable member. A cam profile of the sliding surface is set so that a rotary torque of the cam member necessary for moving the lock member from the locking position to the unlocking position can be maintained at a certain value or less.

According to the above-described aspect of the present invention, only a rotary torque of a certain value or less is needed in order to move the lock member, and the drive source may be selected with reference to the rotary torque of the certain value or less. Accordingly, the lock member can be moved by the drive source having a small rotary torque.

Further, the cam profile may be set so that the rotary torque can be maintained at approximately a constant value over a certain range of rotation angles of the cam member.

With the above-described constitution, the lock member can be efficiently moved by setting the constant value of the rotary torque of the cam member at the maximum allowable value of the rotary torque of the drive source or a value slightly less than this.

Moreover, based on a relational expression of the rotary torque which involves as variables a shift stroke amount of the lock member per rotation angle of the cam member, a radial length from a rotation center of the cam member to a sliding point being a contact point between the cam member and the lock member, and a sliding length of the cam contact surface per rotation angle of the cam member, the cam profile may be set based on values of the variables satisfying the relational expression in which the rotary torque is set at a constant value.

With the above-described constitution, the lock member can be efficiently moved by setting the constant value of the rotary torque of the cam member at the maximum allowable value of the rotary torque of the drive source or a value slightly less than this.

Furthermore, the cam profile may be set by selecting optimum values which give a smooth continuous surface, from candidate values for the radial length and the sliding length which satisfy the relational expression where the shift stroke amount is set at a constant value.

With the above-described constitution, the cam profile of the sliding surface can be determined by a simple procedure.

Also, the cam profile may include a high-load region and a low-load region within a range of movement of the lock member from the locking position to the unlocking position. In the high-load region, the cam profile is set so that the rotary torque can be maintained at approximately a constant value. In the low-load region, the cam profile is set so that a shift stroke amount of the lock member becomes larger than that in the high-load region.

With the above-described constitution, the lock member can be moved using the drive source having a small rotary torque, and a large shift stroke amount of the lock member can be ensured.

BEST MODE FOR CARRYING OUT THE INVENTION

Hereinafter, an embodiment in which an electric lock device of the present invention is applied to an electric steering system will be described with reference to the drawings. In the description below of the drawings, the same or similar components are denoted by the same or similar reference numerals. It should be noted, however, that the drawings are schematic, and that the relationship between thicknesses and plane dimensions, the ratios between the thicknesses of layers, and the like differ from actual ones.

Figure 1:
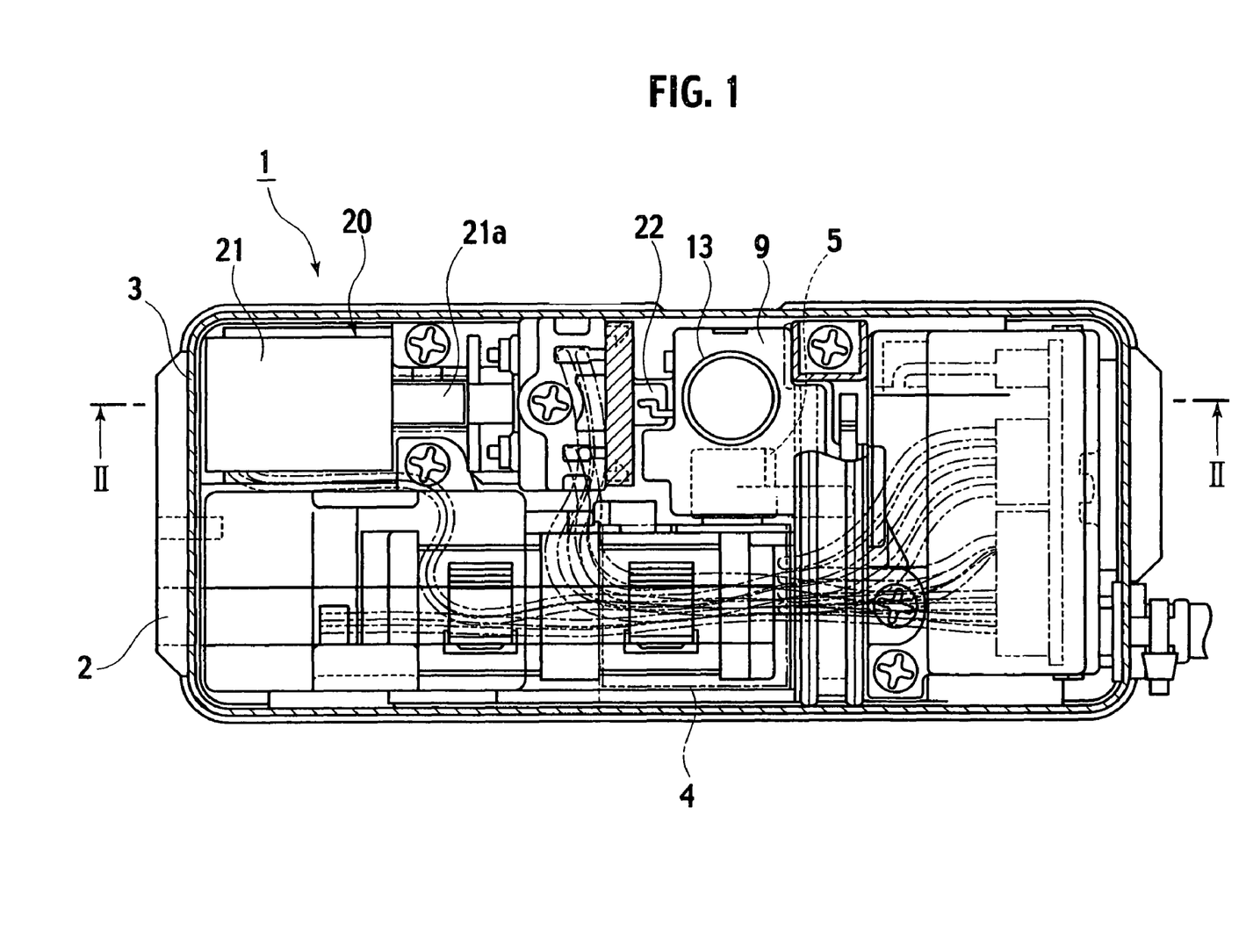
FIG. 1 is a plan view of an electric steering lock device to which an electric lock device according to an embodiment of the present invention is applied.
Figure 2:
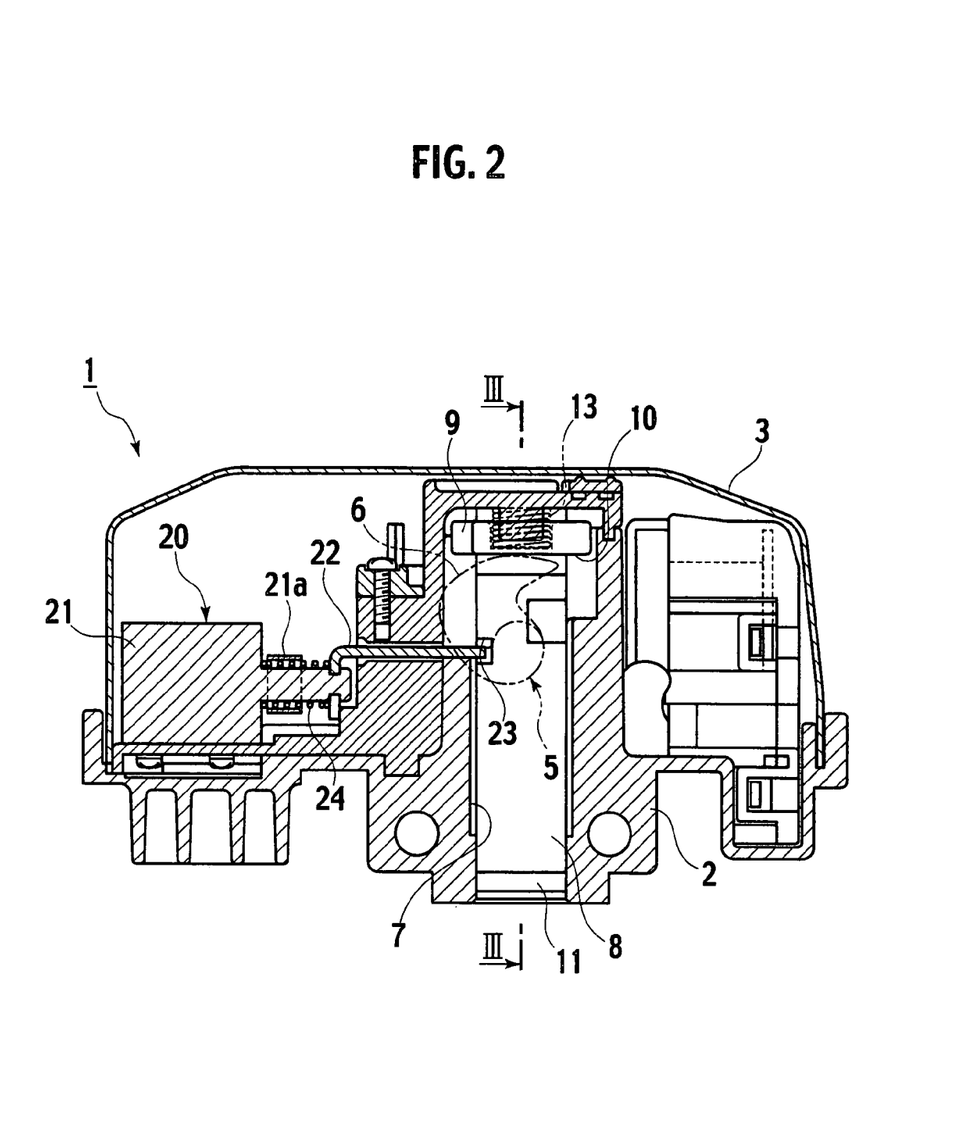
FIG. 2 is a cross-sectional view taken along line II-II of FIG. 1 for the case where a lock shaft is positioned at an unlocking position.
Figure 3:
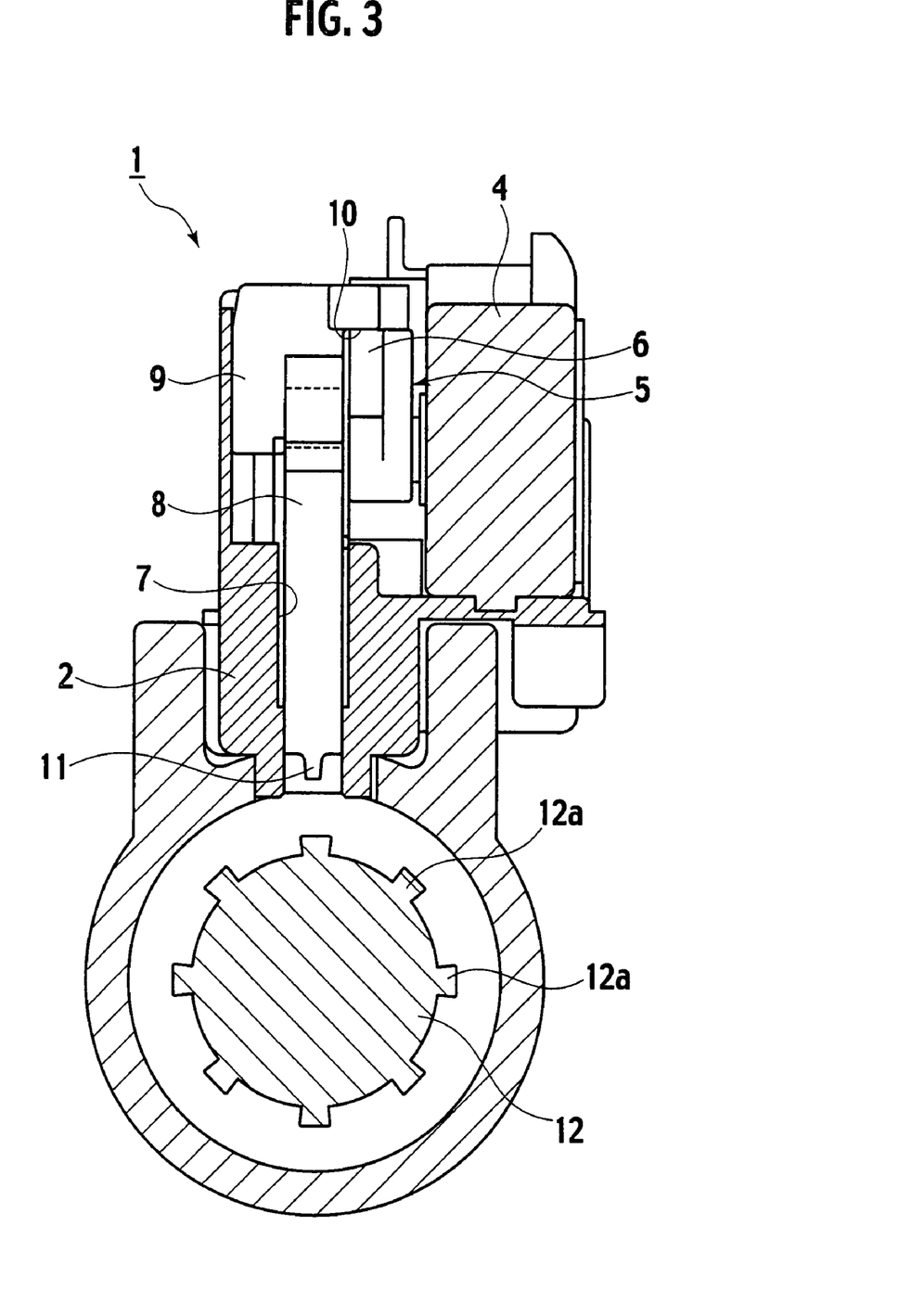
FIG. 3 is a cross-sectional view taken along line III-III of FIG. 2.
Figure 4:
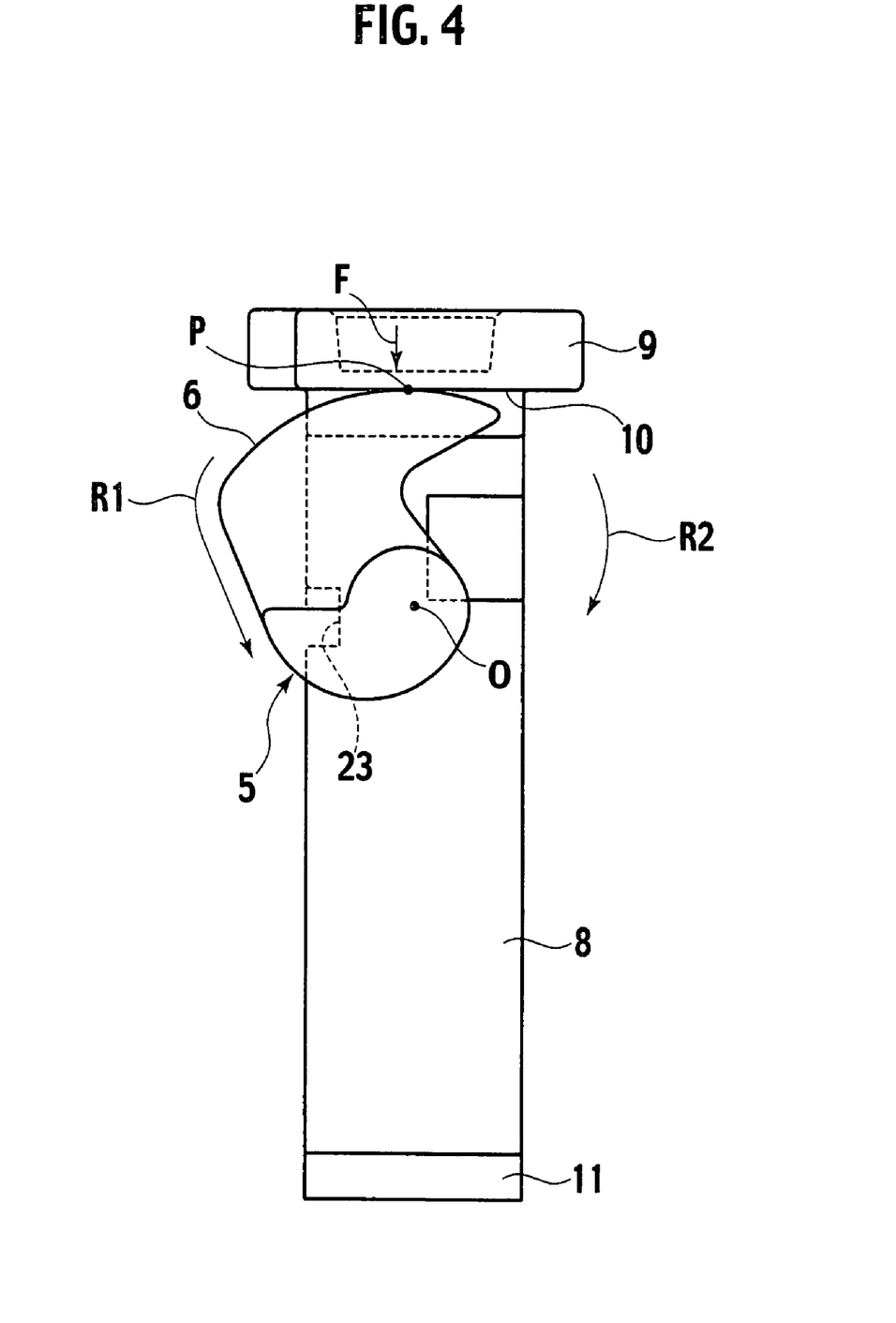
FIG. 4 is an enlarged schematic diagram showing the arrangement of the lock shaft and a cam plate at the unlocking position in the electric steering lock device to which the electric lock device according to the embodiment of the present invention is applied.
Figure 5:
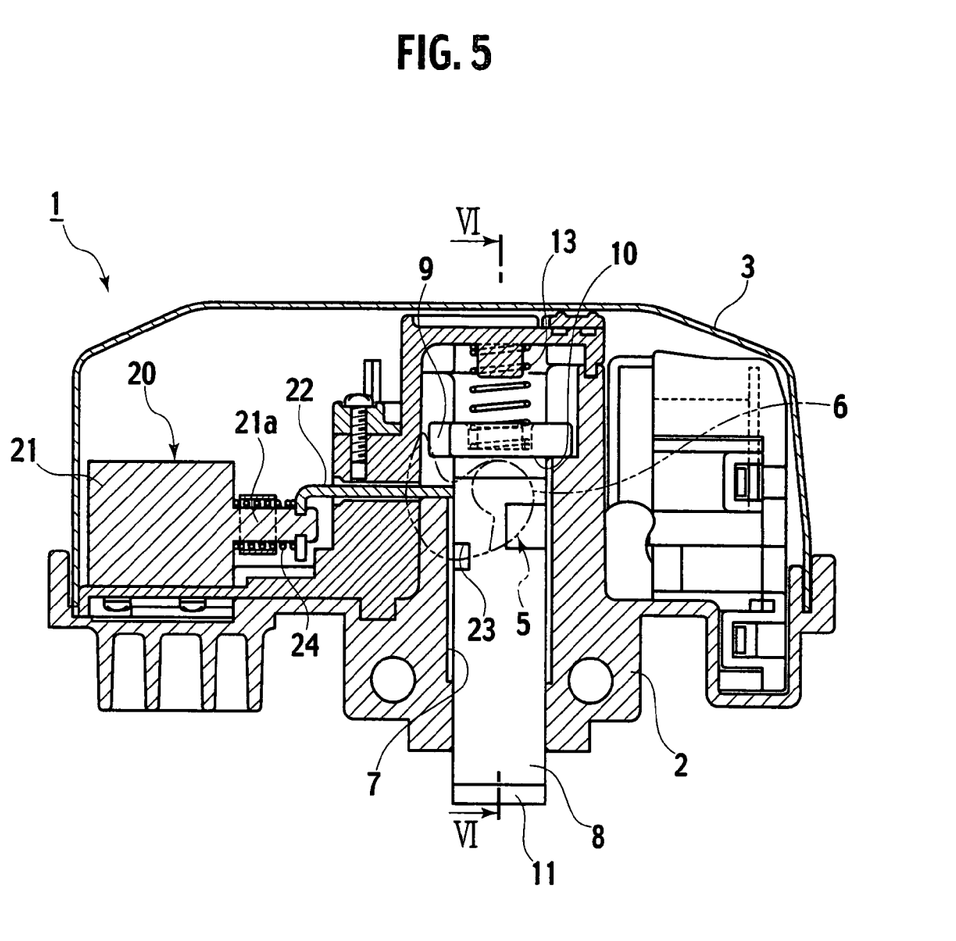
FIG. 5 is a cross-sectional view taken along line II-II of FIG. 1 for the case where the lock shaft is positioned at a locking position.
Figure 6:
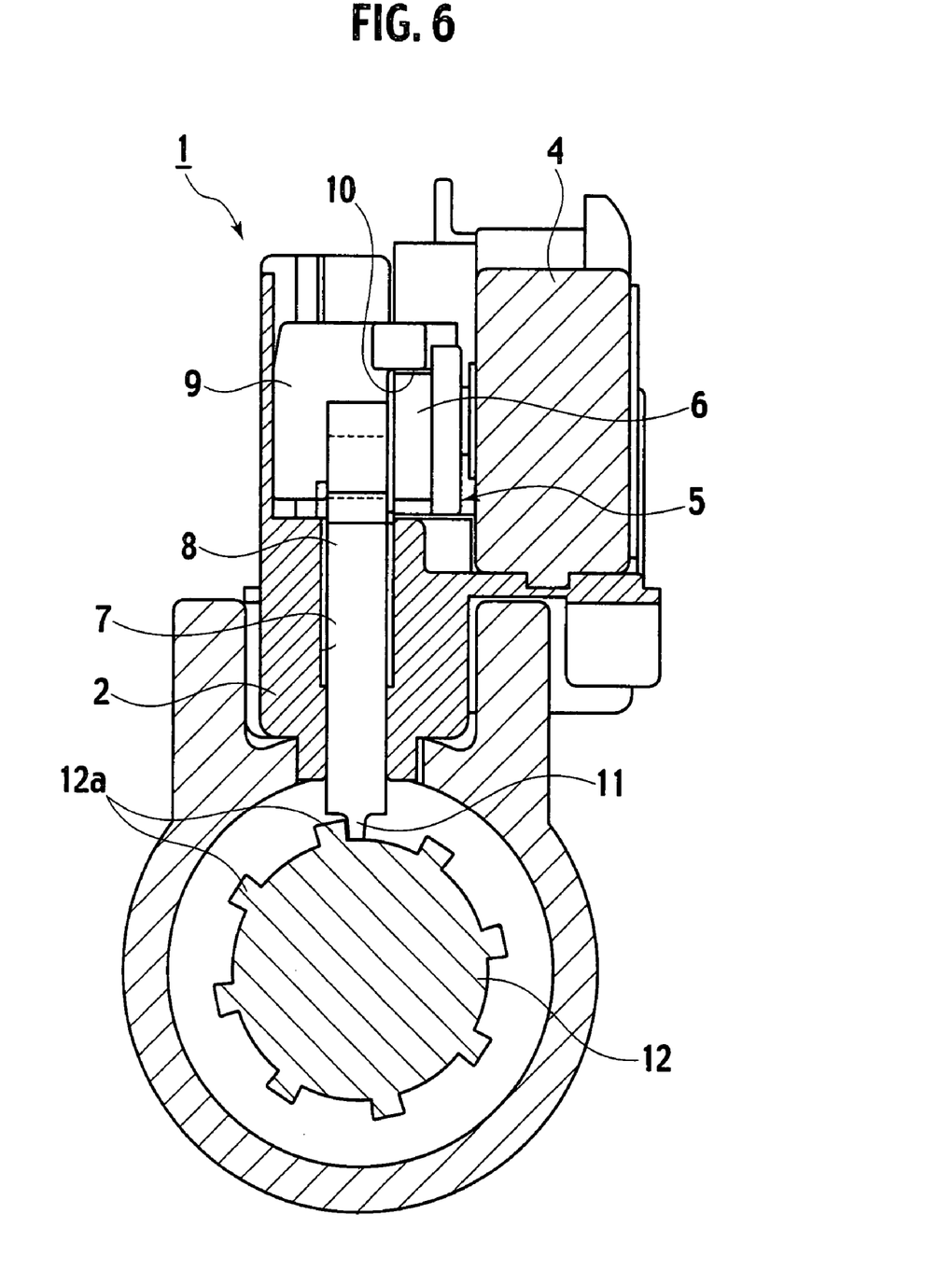
FIG. 6 is a cross-sectional view taken along line VI-VI of FIG. 5.
Figure 7:
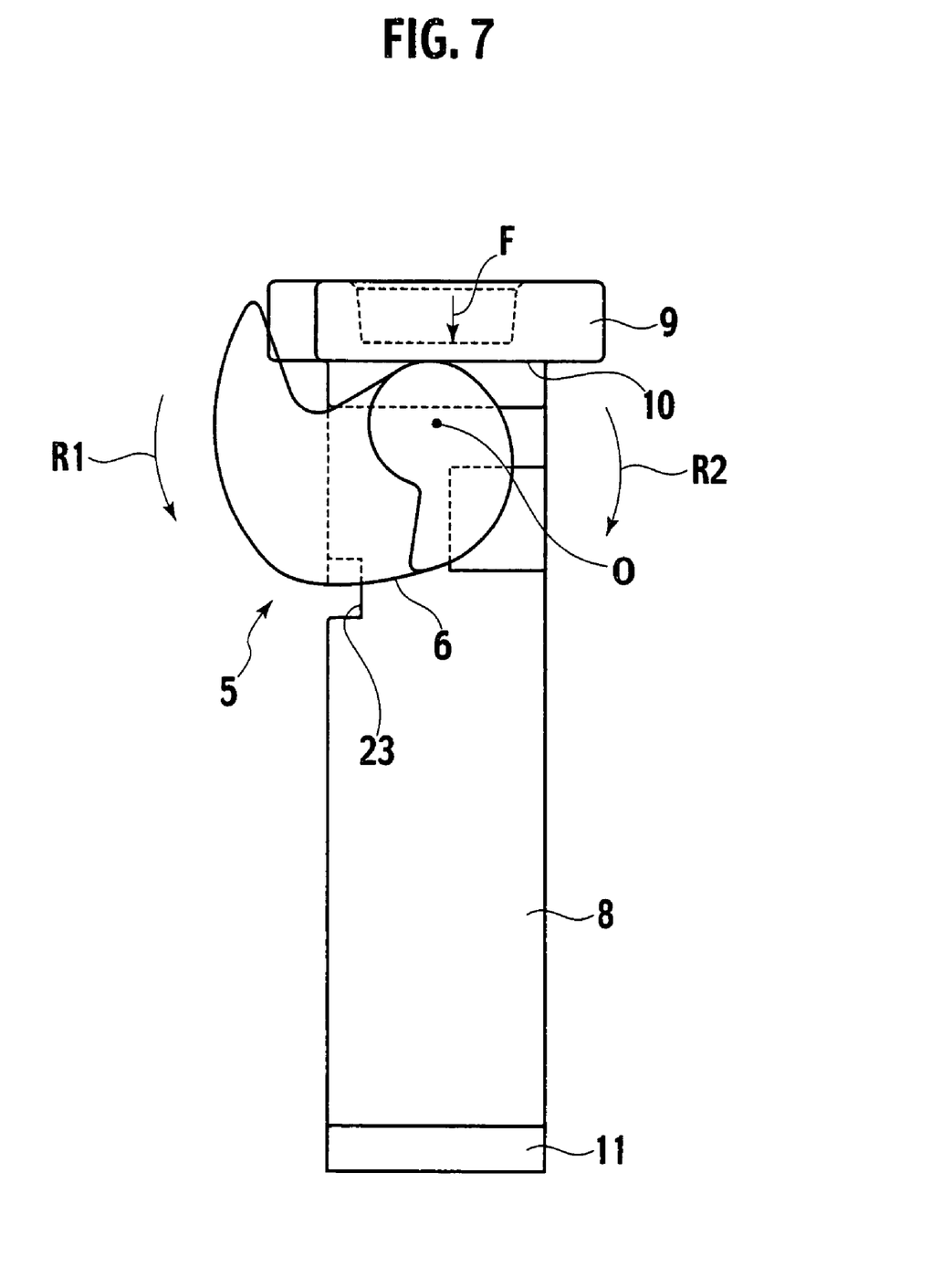
FIG. 7 is an enlarged schematic diagram showing the arrangement of the lock shaft and the cam plate 5 at the locking position in the electric steering lock device to which the electric lock device according to the embodiment of the present invention is applied.

FIGS. 1 to 7 show the embodiment of the present invention. FIG. 1 is a plan view of an electric steering lock device 1. FIG. 2 is a cross-sectional view taken along line II-II of FIG. 1 for the case where a lock shaft 8 is positioned at an unlocking position. FIG. 3 is a cross-sectional view taken along line III-III of FIG. 2. FIG. 4 is an enlarged schematic diagram showing the arrangement of the lock shaft 8 and a cam plate 5 at the unlocking position. FIG. 5 is a cross-sectional view taken along line II-II of FIG. 1 for the case where the lock shaft 8 is positioned at a locking position. FIG. 6 is a cross-sectional view taken along line VI-VI of FIG. 5. FIG. 7 is an enlarged schematic diagram showing the arrangement of the lock shaft 8 and the cam plate 5 at the locking position.

As shown in FIGS. 1, 2, and 5, the electric steering lock device 1 as an electric lock device includes a frame 2 and a cover 3 for covering the upper side of this frame 2. A motor unit 4, which is a drive source, is fixed to the upper surface of the frame 2 which is covered with the cover 3. The motor unit 4 includes a speed reduction mechanism, and the cam plate 5, which is a cam member, is fixed to a rotating shaft (not shown) protruding from a unit case.

The cam plate 5 is rotated in an unlocking direction R1 and a locking direction R2 opposite to the unlocking direction R1 by the rotation of the rotating shaft. The peripheral surface of the cam plate 5 is formed as a sliding surface 6. The sliding surface 6 is set so that the distance between the sliding surface 6 and the rotation center O gradually changes as the rotation angle changes. Further, the sliding surface 6 is set so that the distance to a sliding point at which the undermentioned lock shaft 8 is positioned at the locking position (see FIG. 7) becomes a minimum distance, and set so that the distance to a sliding point at which the lock shaft 8 is positioned at the unlocking position (see FIG. 4) becomes a maximum distance. Details of the cam profile of the sliding surface 6 will be described in detail later.

In the frame 2, a slide hole 7 penetrating vertically is formed. In this slide hole 7, the lock shaft 8, which is a lock member, is movably placed. To the upper end of the lock shaft 8, a hanger portion 9 is fixed. The lower surface of this hanger portion 9 is formed as a cam contact surface 10. The cam contact surface 10 is in contact with the sliding surface 6 of the cam plate 5. The spring force F of a spring 13 acts upon the upper surface of the hanger portion 9. By the spring force F, the lock shaft 8 is biased toward the locking position, and concurrently the cam contact surface 10 is pressed against the cam plate 5.

To the lower end of the lock shaft 8, an engaging pin portion 11 is provided. The lock shaft 8 moves following the sliding surface 6 of the cam plate 5, thereby moving between the locking position shown in FIGS. 5 to 7 and the unlocking position shown in FIGS. 2 to 4. At the locking position, the engaging pin portion 11 is thrust into a space between protrusions 12a of a steering shaft 12 as a movable member (state shown in FIG. 6) to inhibit the rotational movement of the steering shaft 12. At the unlocking position, the engaging pin portion 11 is positioned at a position outside the rotational locus of the protrusions 12a of the steering shaft 12 (state shown in FIG. 3) to allow the rotational movement of the steering shaft 12.

Moreover, as shown in FIGS. 1, 2 and 5, the electric steering lock device 1 includes steering lock prevention means 20. This steering lock prevention means 20 includes an electromagnetic solenoid 21 fixed to the upper surface of the frame 2, covered with the cover 3. To a movable rod 21a of this electromagnetic solenoid 21, one end of a lock plate 22 is fixed. The tip of this lock plate 22 extends to a vicinity of the lock shaft 8. When the lock shaft 8 is positioned at the unlocking position and the electromagnetic solenoid 21 is off, the lock plate 22 is thrust into a locking groove 23 of the lock shaft 8 by a spring 24, thus inhibiting the movement of the lock shaft 8. When the electromagnetic solenoid 21 is turned on, the lock plate 22 recedes from the locking groove 23 of the lock shaft 8, thus allowing the movement of the lock shaft 8.

Figure 8:
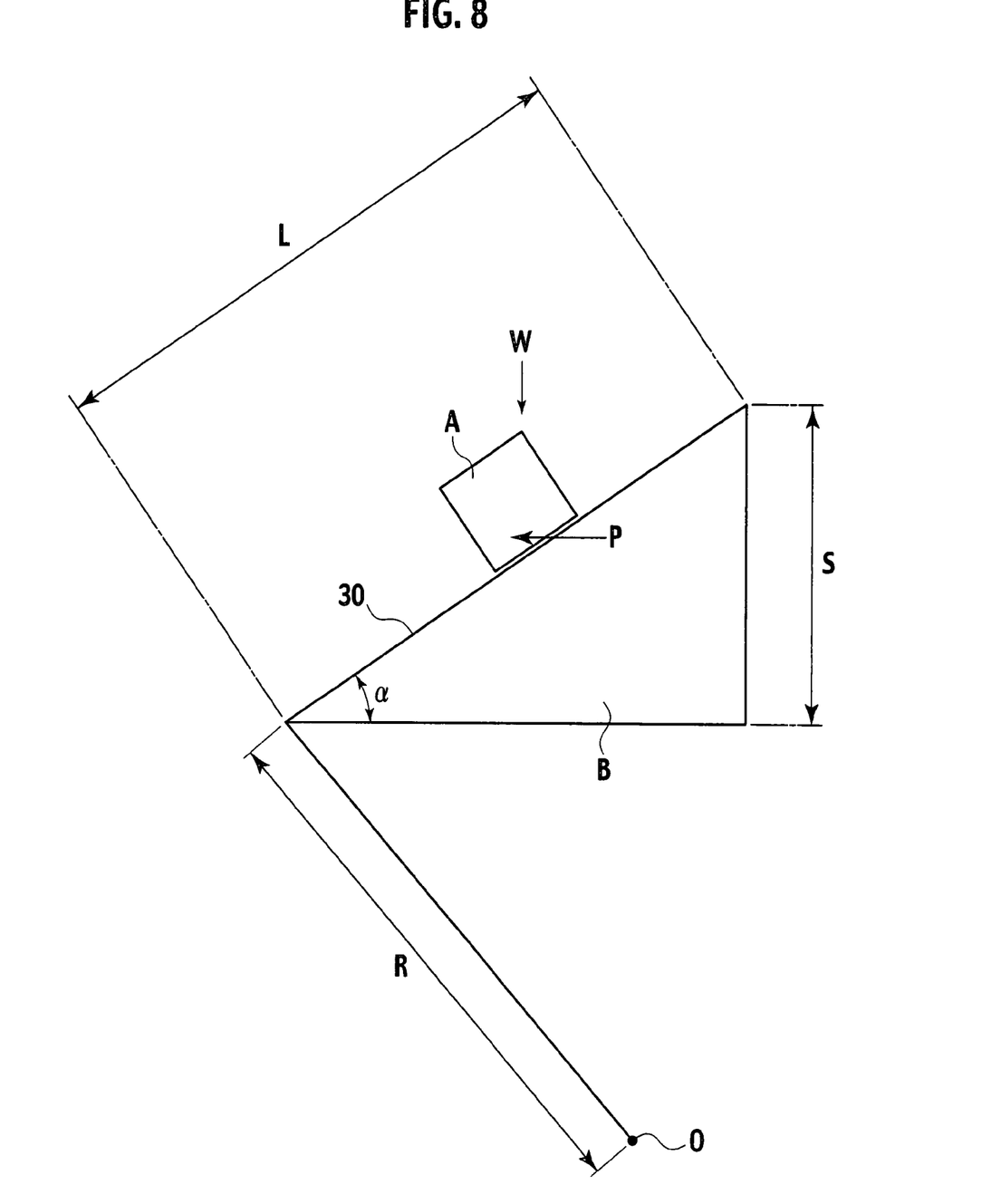
FIG. 8 is a model diagram for considering the movement of the lock shaft caused by the cam plate in the electric steering lock device to which the electric lock device according to the embodiment of the present invention is applied.

Next, details of the cam profile of the cam plate 5 will be described. First, when the operation of unlocking the lock shaft 8 using the cam plate 5 is considered, the model diagram of FIG. 8 is effective. In FIG. 8, an object A corresponds to the lock shaft 8, and an inclined member B corresponds to the cam plate 5. It is assumed that the object A is mounted on the inclined surface 30 of the inclined member B which corresponds to the sliding surface 6 of the cam plate 5, and that the object A can move only in the vertical direction. It is assumed that the object A is subjected to a vertical load W (including the spring force F) and also to a horizontal load P from the inclined member B. The load W has a value which guarantees reliable movement if the lock shaft 8 can be moved from the locking position to the unlocking position under this load W. The load P is the pressing force with which the rotating cam plate 5 presses the lock shaft 8 using the sliding surface 6 thereof. In the model diagram described above, when the inclined member B rotates about the rotation center O, the object A slides up on the inclined surface 30. This behavior can be considered to be the same as a displacement of the lock shaft 8 caused by the rotation of the cam plate 5.

Here, Let L be the sliding length over which the object A slides on the inclined surface 30 of the inclined member B when the inclined member B rotates by a predetermined rotation angle (e.g., 10 degrees), S be the amount of upward stroke of the object A, and R be the length from the rotation center O of the inclined member B to the sliding point of the object A.

Figure 9:
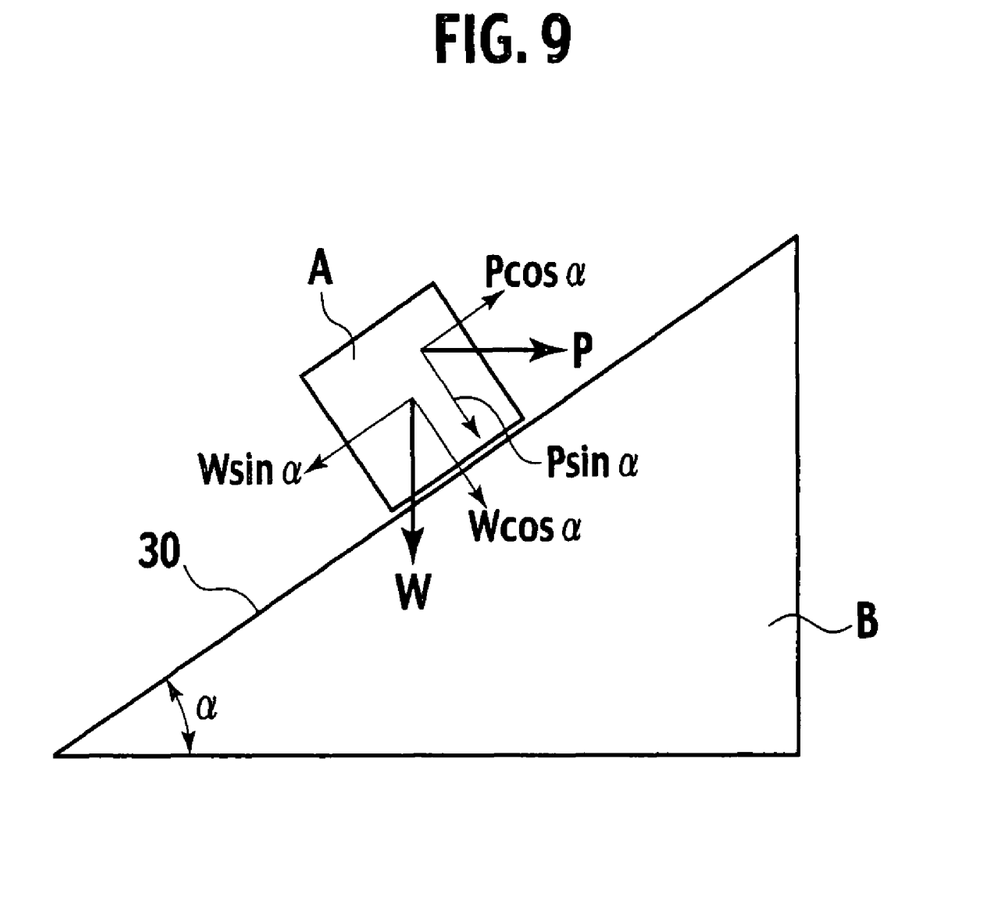
FIG. 9 is a model diagram showing component forces of loads in the electric steering lock device to which the electric lock device according to the embodiment of the present invention is applied.

As shown in FIG. 9, external forces, which act on the object A sliding on the inclined surface 30, in a direction parallel to the inclined surface 30 include the component force W·Sin α of the load W, the component force P·Cos α of the load P, and the kinetic frictional forces μ·W·Cos α and μ·P·Sin α (μ is the coefficient of kinetic friction) due to reaction forces produced by the loads W and P, respectively. The equilibrium equation of forces acting on the object A in the direction parallel to the inclined surface 30 is P·Cos α=W·Sin α+μ(W Cos α+P Sin α). Modifying this equation into an equation of P yields $$P = W \cdot (\tan \alpha + \mu)/(1 - \mu \cdot \tan \alpha) \quad (1)$$

Here, since the rotary torque T of the cam plate 5 is T=R·P, modifying equation (1) into an equation of T yields $$T = W \cdot R \cdot (\tan \alpha + \mu)/(1 - \mu \cdot \tan \alpha) \quad (2)$$

In this equation (2), W and μ are constant values. If the value of the radial length R from the rotation center O of the cam plate 5 and the value of the inclination angle α are set so that the rotary torque T can be maintained at a constant value, the object A, i.e., the lock shaft 8, can be moved with the rotary torque maintained constant. As can be seen from the model diagram of FIG. 8, since Sin α=S/L, the inclination angle α can be substituted by the sliding length L and the shift stroke S.

Accordingly, if the cam profile of the cam plate 5 is set based on the respective values of the radial length R, the sliding length L, and the shift stroke amount S satisfying the aforementioned equation (2) with the rotary torque T set at a constant value, the object A, i.e., the lock shaft 8, can be moved with the rotary torque maintained constant.

Next, one example of a specific procedure for creating the cam profile of the cam plate 5 will be described. In this embodiment, an optimum sliding point is selected for each rotation angle by increasing the rotation angle θ of the cam plate 5 in steps of 10 degrees, and the sliding points are finally connected, thus creating a cam profile. Here, as described above, there are three variables: the radial length R, the sliding length L, and the shift stroke S. Of these three variables, the shift stroke amount S is set at an arbitrary appropriate predetermined value S1, and the work of specifying a sliding point is performed.

Figure 10:
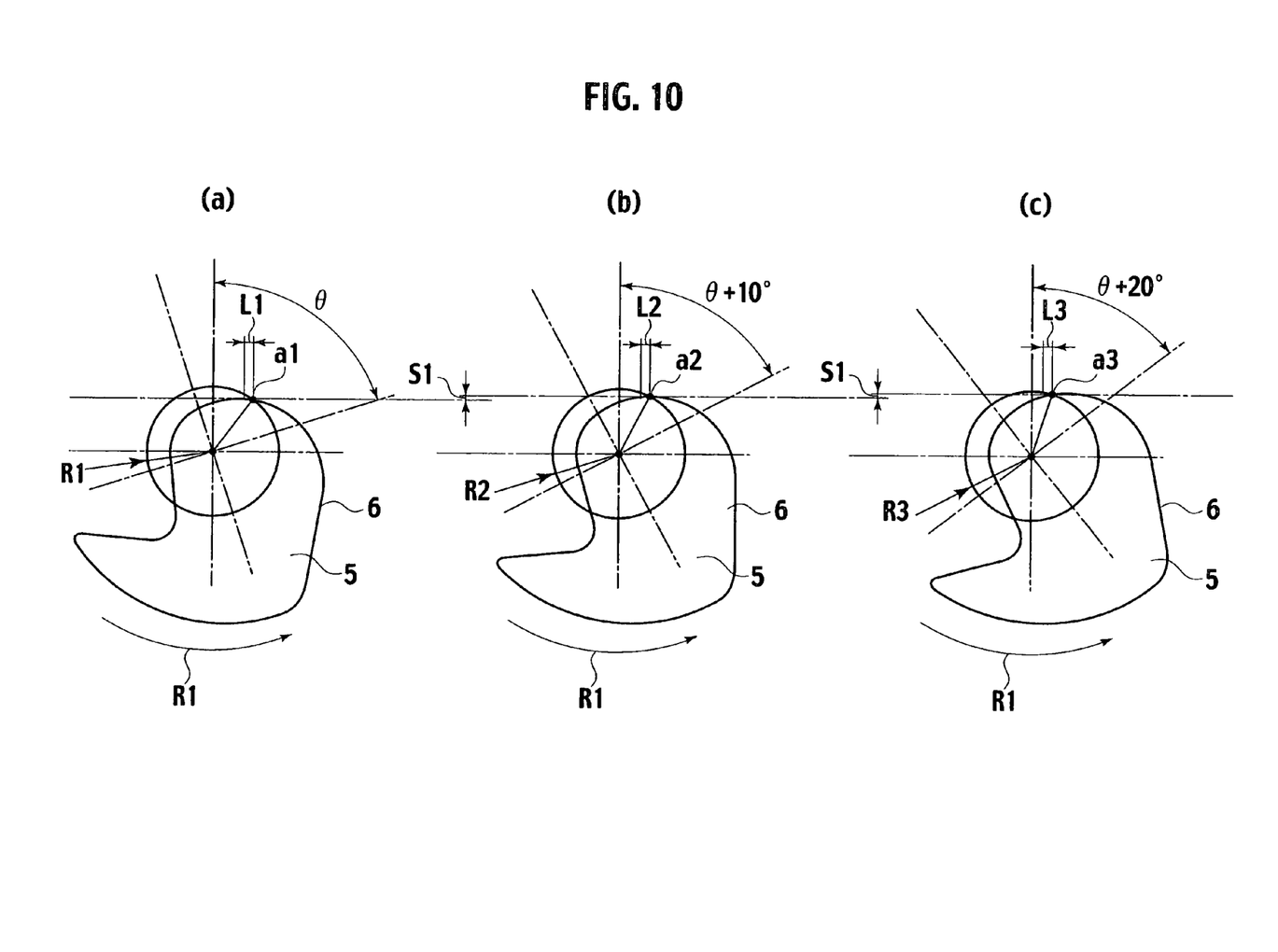
FIGS. 10(a) to 10(c) are views each of which is used to explain a procedure for creating the cam profile of the cam plate in the electric steering lock device to which the electric lock device according to the embodiment of the present invention is applied.

FIG. 10(a) shows the position of the cam plate 5 for an arbitrary rotation angle θ. Let a1 be the sliding point on the sliding surface 6 on which the lock shaft 8 slides, and let R1 be the radial length from the rotation center O to the sliding point a1.

FIG. 10(b) shows the position of the cam plate 5 for a rotation angle of (θ+10). The shift stroke amount S from the position for a rotation angle of (θ) shown in FIG. 10(a) to the position for a rotation angle of (θ+10) is set at a predetermined value S1. Optimum values L1 and R1, i.e., ones which give a sliding point a2 for a smooth continuous cam profile, are selected from candidate values for the sliding length L and the radial length R which satisfy the aforementioned equation (2). These optimum values L1 and R1 are plotted.

FIG. 10(c) shows the position of the cam plate 5 for a rotation angle of (θ+20). The shift stroke S from the position for a rotation angle of (θ+10) shown in FIG. 10(b) to the position for a rotation angle of (θ+20) is set at the predetermined value S1. Optimum values L2 and R2, i.e., ones which give a sliding point a3 for a smooth continuous cam profile, are selected among candidate values for the sliding length L and the radial length R which satisfy the aforementioned equation (2). These optimum values L2 and R2 are plotted. By repeating the above, a cam profile is created.

Figure 11:
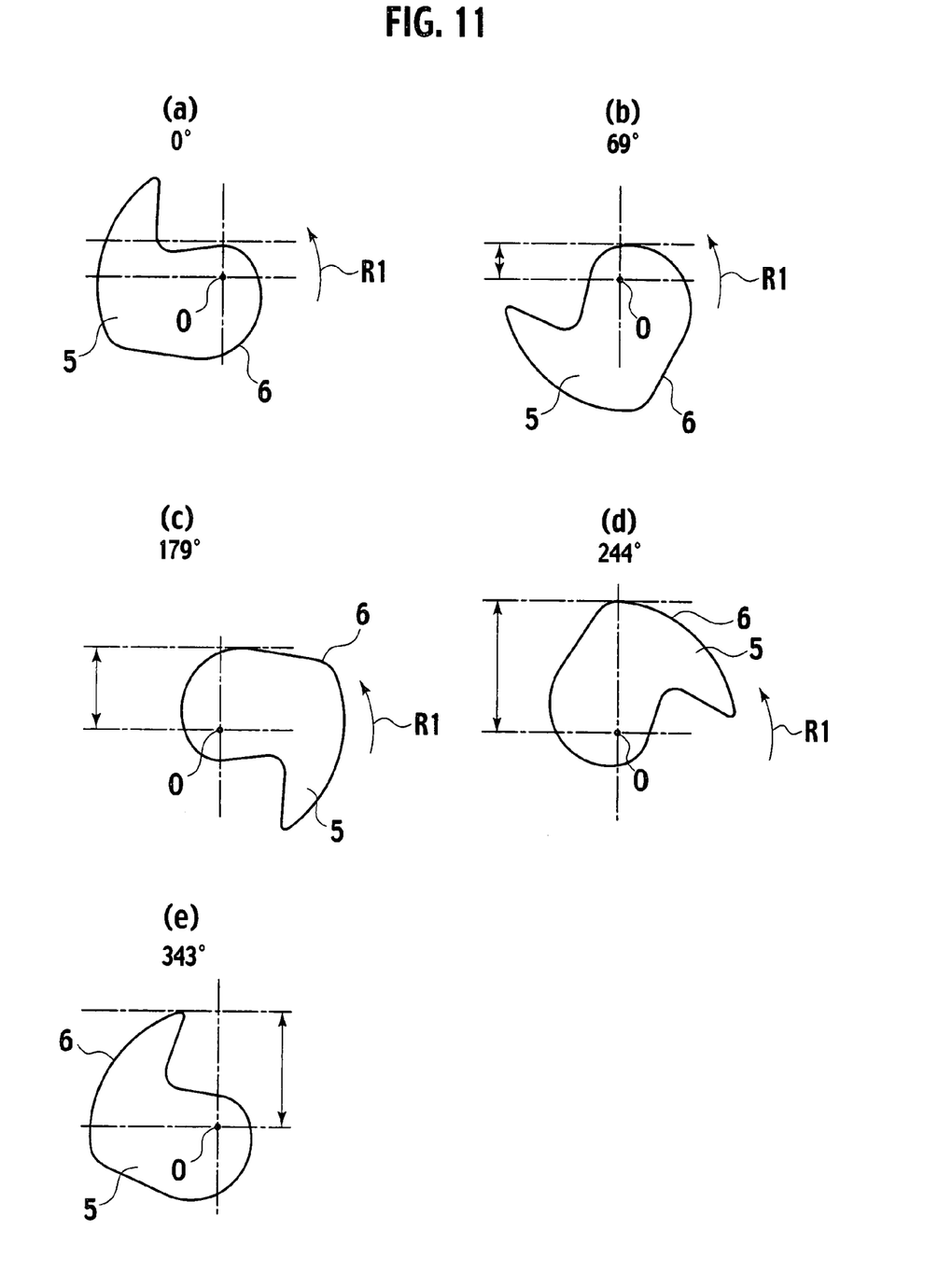
FIGS. 11(a) to 11(e) are views showing states of the cam plate for respective rotation positions in the electric steering lock device to which the electric lock device according to the embodiment of the present invention is applied.

Moreover, in the case where the lock shaft 8 is positioned at the locking position, the cam plate 5 starts rotating from a rotation angle of 0 degrees shown in FIG. 11(a), and the unlocking movement of the lock shaft 8 is started from the point for a rotation angle of 69 degrees shown in FIG. 11(b). A high-load region is from the point for a rotation angle of 69 degrees shown in FIG. 11(b) to the point for a rotation angle of 179 degrees shown in FIG. 11(c), and the other region is a low-load region (almost no load). The unlocking movement of the lock shaft 8 is finished at the point for a rotation angle of 244 degrees shown in FIG. 11(d), and the rotation of the cam plate 5 is finished at the position for a rotation angle of 343 degrees shown in FIG. 11(e).

Figure 12:
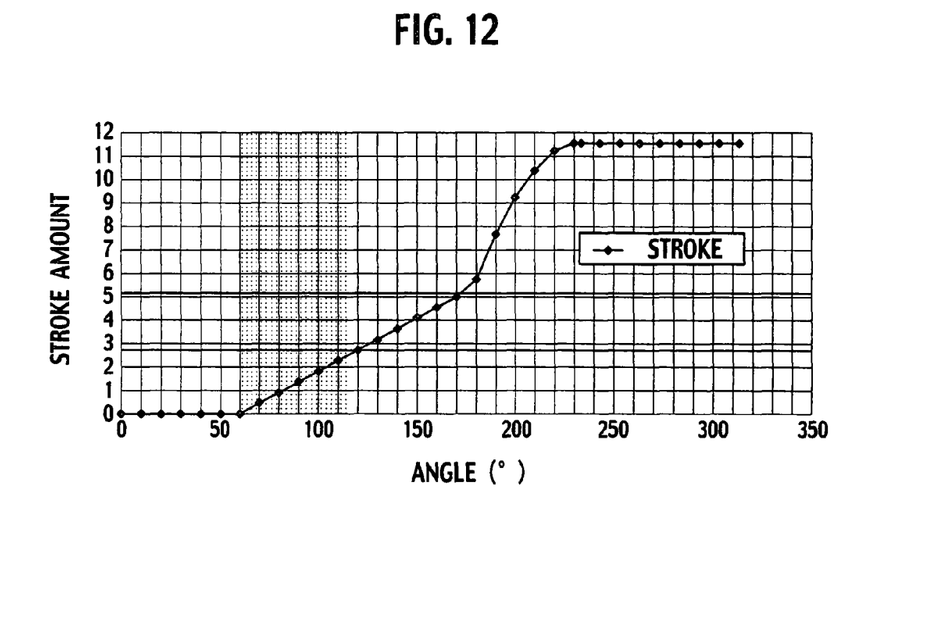
FIG. 12 is a view of a characteristic curve showing the shift stroke amount of the lock shaft with respect to the rotation angle of the cam plate in the electric steering lock device to which the electric lock device according to the embodiment of the present invention is applied.

FIG. 12 shows the shift stroke amount of the lock shaft 8 with respect to the rotation angle of the cam plate 5. The horizontal axis represents the rotation angle of the cam plate 5, and the vertical axis represents the displacement stroke amount of the lock shaft 8.

Figure 13:
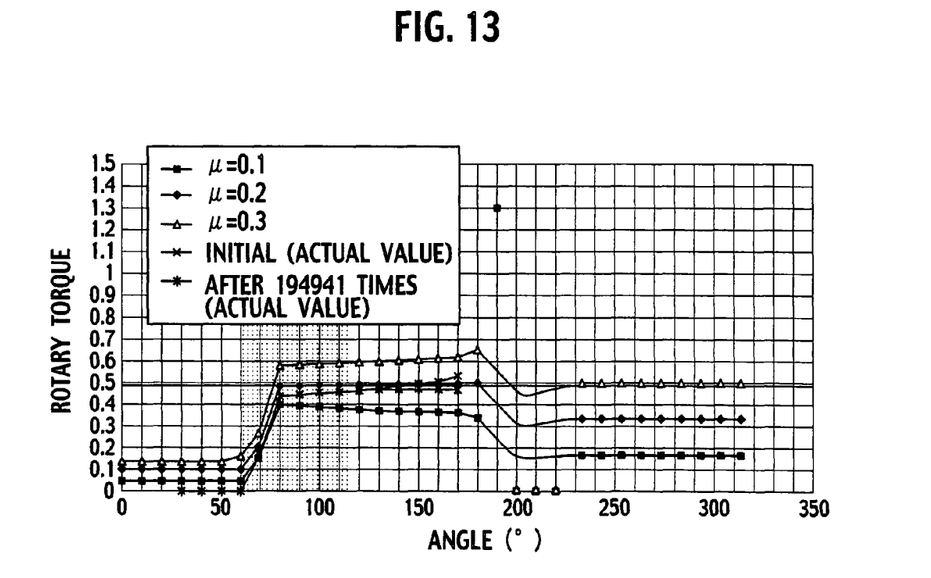
FIG. 13 is a view showing characteristic curves of calculated values (conditions in which coefficients of kinetic friction are different) and actual values of the rotary torque of the cam plate in the electric steering lock device to which the electric lock device according to the embodiment of the present invention is applied.

FIG. 13 is a view showing characteristic curves of the rotary torque and rotation angle of the cam plate 5 when the load W (=100 N) is applied to the lock shaft. The horizontal axis represents the rotation angle of the cam plate 5, and the vertical axis represents the rotary torque of the cam plate 5. As shown in FIG. 13, in the high-load region, in the range in which the rotation angle is between 69 degrees and approximately 80 degrees, the cam profile is set so that the rotary torque of the cam plate 5 necessary for moving the lock shaft 8 gradually increases, and, in the range in which the rotation angle is between approximately 80 degrees and 179 degrees, the cam profile is set so that the rotary torque of the cam plate 5 necessary for moving the lock shaft 8 can be maintained at approximately a constant value. This constant value is set at, for example, the maximum allowable value of the rotary torque of the motor unit 4 or a value slightly less than this. As shown in FIGS. 12 and 13, in the low-load region, the cam profile of the cam plate 5 is set to be one in which importance is placed on the displacement stroke amount of the lock shaft 8.

In the above-described constitution, during the period in which a vehicle is parked, the lock shaft 8 is positioned at the locking position shown in FIGS. 5 to 7, and the rotation of the steering shaft 12 is locked. Using such a lock device, for example, the theft of the vehicle can be prevented.

Then, when a driver pushes a steering lock switch (not shown) to start the engine, the motor unit 4 is driven to rotate the cam plate 5 in the unlocking direction R1. Thereby, the lock shaft 8 moves to the unlocking position shown in FIGS. 2 to 4, and the rotation of the steering shaft 12 is allowed.

When the lock shaft 8 has moved to the unlocking position, the lock plate 22 coupled to the electromagnetic solenoid 21 of the steering lock prevention means 20 is locked with the locking groove 23 of the lock shaft 8 by the biasing force of the spring 24. During the period in which the vehicle is running by starting the engine, the lock shaft 8 is maintained at the unlocking position, and the free rotation of the steering shaft 12 is allowed.

When the engine is stopped, the electromagnetic solenoid 21 of the steering lock prevention means 20 is turned on, the lock plate 22 is removed from the locking groove 23 of the lock shaft 8, and the motor unit 4 is driven to rotate the cam plate 5 in the locking direction R2. Thus, the lock shaft 8 moves to the locking position shown in FIGS. 5 to 7, and the rotation of the steering shaft 12 is inhibited.

The movement of the lock shaft 8 from the locking position to the unlocking position caused by the cam plate 5 in the process of the above-described operation will be described in detail. As shown in FIG. 13, during the period in which the rotation angle of the cam plate 5 is between 0 degrees and 69 degrees, since the sliding surface 6 of the cam plate 5 is a perfect arc, a rotary torque required for the cam plate 5 is almost zero.

When the rotation angle of the cam plate 5 exceeds 69 degrees, the lock shaft 8 starts being moved by the cam plate 5. During the period in which the rotation angle of the cam plate 5 is between 69 degrees and approximately 80 degrees, the value of the rotary torque of the cam plate 5 necessary for moving the lock shaft 8 increases at an approximately constant rate. When the rotation angle of the cam plate 5 exceeds approximately 80 degrees, the value of the rotary torque of the cam plate 5 necessary for moving the lock shaft 8 becomes a constant value. The value of the rotary torque is maintained at the constant value until the rotation angle of the cam plate 5 reaches 179 degrees, i.e., until passing through the high-load region. It should be noted that in an actual device, when the rotation angle of the cam plate 5 exceeds 179 degrees, the low-load region (almost no load) of the lock shaft 8 is reached, the shift stroke amount of the lock shaft 8 is large as shown in FIG. 12, and it moves smoothly.

As described above, in this electric steering lock device 1, the cam plate 5 only needs a rotary torque of a certain value or less in order to displace the lock shaft 8 from the locking position to the unlocking position, and the motor unit 4 may be selected with reference to the rotary torque of the certain value or less. Accordingly, the lock shaft 8 can be displaced by the motor unit 4 having a small rotary torque.

In this embodiment, the cam profile of the sliding surface 6 of the cam plate 5 is set so that the rotary torque of the cam plate 5 necessary for moving the lock shaft 8 can be maintained at approximately a constant value over a certain range (from 80 degrees to 179 degrees) of rotation angles of the cam plate 5. Accordingly, the lock shaft 8 can be efficiently moved by setting the constant value at the maximum allowable value of the rotary torque of the motor unit 4 or a value slightly less than this.

In this embodiment, the shift stroke amount S of the lock shaft 8 per rotation angle of the cam plate 5 is maintained at approximately a constant value, and the cam profile is set by selecting optimum values of the length R from the rotation center O of the cam plate 5 to the sliding point and the sliding length L of the cam contact surface 10 of the lock shaft 8 per rotation angle of the cam plate 5, which optimum values make the cam profile of the sliding surface 6 a smooth continuous surface, from candidate values which satisfy a predetermined relational expression. Accordingly, the cam profile of the sliding surface 6 can be determined by a simple procedure.

In this embodiment, the region in which the rotary torque of the cam plate 5 is set to be approximately a constant value in the cam profile is limited to the high-load range within the range of movement of the lock shaft 8 from the locking position to the unlocking position. Furthermore, in the low-load range, the cam profile of the sliding surface 6 is set to be one in which importance is placed on the shift stroke amount of the lock shaft 8. Accordingly, the lock shaft 8 can be moved using the motor unit 4 having a small rotary torque. Also, a large shift stroke amount of the lock shaft 8 can be ensured.

Moreover, in this embodiment, the above-described constitution of the cam plate 5 and the steering lock prevention means 20 doubly prevent the risk of locking the steering shaft 12 during the driving or the like of the vehicle. In particular, the cam plate 5 prevents a situation in which the lock shaft 8 locks the steering shaft 12 in cases including one where the steering lock prevention means 20 does not normally work due to some cause. The steering lock prevention means 20 prevents a situation in which the lock shaft 8 biased by the spring 13 locks the steering shaft 12 in, for example, the case where the cam plate 5 almost starts rotating unexpectedly due to a malfunction in the motor unit 4, or the case where the lock shaft 8 is unexpectedly detached from the cam plate 5 due to strong vibrations or the like during driving.

It should be noted that though the steering lock prevention means 20 is provided in this embodiment, the steering shaft 12 can be prevented from being locked during the driving of the vehicle even if the steering lock prevention means 20 is not provided. Not providing the steering lock prevention means 20 can make the electric steering lock device 1 more compact, lighter, less expensive, and the like.

Furthermore, in this embodiment, a description has been given for the case where the electric lock device of the present invention is applied to an electric steering system in which a movable member is a steering shaft. However, similar effects can also be obtained in the case where the electric lock device of the present invention is applied to a shift lock device or the like of an automatic transmission in which a movable member is a select lever.

Although the present invention has been described above using the embodiment, the present invention is not limited to this. Each component can be replaced by one having an equivalent function and an arbitrary constitution.

INDUSTRIAL APPLICABILITY

An electric lock device is provided in which a lock member can be moved using a drive source having a small rotary torque.

The invention claimed is:
1. An electric lock device comprising:
  a movable member;
  a cam member rotated in an unlocking direction and a locking direction by driving of a drive source; and
  a lock member including a cam contact surface in contact with a sliding surface of the cam member, the lock member following the sliding surface to move between a locking position for inhibiting movement of the movable member and an unlocking position for allowing the movement of the movable member,
  wherein a cam profile of the sliding surface is set so that a rotary torque of the cam member for moving the lock member from the locking position to the unlocking position is calculated by the equation

$$T = W \cdot R \cdot (\tan \alpha + \mu)/(1 - \mu \cdot \tan \alpha),$$

with

T=the rotary torque of the cam member,

R=a radial length from a rotation center of the cam member,

W=a constant load on the cam member,

α=an angle of inclination between load W and the cam, and

μ=a constant coefficient of kinetic friction;

the rotary torque of the cam member is maintained at a constant value over a certain range of rotation angles of the cam member, and the lock member is moved in the certain range of rotation angles, wherein the cam profile comprises a high-load region and a low-load region within a range of movement of the lock member from the locking position to the unlocking position, a load on the drive source in the low-load region being lower than a load on the drive source in the high-load region, the high-load region corresponds to the certain range of rotation angles, and in the low-load region, the cam profile is set so that a shift stroke amount of the lock member per rotation angle of the cam member is larger than that in the high-load region.

2. The electric lock device according to claim 1, wherein based on a relational expression of the rotary torque, the relational expression involving as variables a shift stroke amount of the lock member per rotation angle of the cam member, a radial length from the rotation center of the cam member to a sliding point being a contact point between the cam member and the lock member, and a sliding length of the cam contact surface per rotation angle of the cam member, the cam profile is set based on values of the variables satisfying the relational expression in which the rotary torque is set at a constant value.

3. The electric lock device according to claim 2, wherein the cam profile is set by selecting optimum values which give a smooth continuous surface, from candidate values for the radial length and the sliding length, the candidate values satisfying the relational expression in which the shift stroke amount is set at a constant value.

* * * * *